United States Patent
Kita (10) Patent No.: US 7,433,545 B2
(45) Date of Patent: Oct. 7, 2008

(54) IMAGE PROCESSING APPARATUS AND IMAGE PROCESSING METHOD FOR CORRECTING IMAGE DATA

(75) Inventor: Koji Kita, Wakayama-ken (JP)

(73) Assignee: Noritsu Koki Co., Ltd., Wakayama-shi (JP)

( * ) Notice: Subject to any disclaimer, the term of this patent is extended or adjusted under 35 U.S.C. 154(b) by 773 days.

(21) Appl. No.: 11/067,054

(22) Filed: Feb. 25, 2005

(65) Prior Publication Data

US 2005/0195297 A1    Sep. 8, 2005

(30) Foreign Application Priority Data

Mar. 3, 2004    (JP)    ............... 2004-058964

(51) Int. Cl.
*G06K 9/32* (2006.01)
*G06K 9/40* (2006.01)
*G06K 9/00* (2006.01)

(52) U.S. Cl. ...................... 382/299; 382/275
(58) Field of Classification Search .............. 382/299, 382/300, 112, 167, 254, 260, 274, 275; 358/453
See application file for complete search history.

(56) References Cited

U.S. PATENT DOCUMENTS

| | | | | |
|---|---|---|---|---|
| 5,266,805 A | * | 11/1993 | Edgar | ............... 250/330 |
| 5,875,040 A | * | 2/1999 | Matraszek et al. | ............... 358/453 |
| 6,295,087 B1 | * | 9/2001 | Nohda | ............... 348/234 |
| 2002/0131649 A1 | * | 9/2002 | Yamaguchi | ............... 382/275 |

FOREIGN PATENT DOCUMENTS

| | | | |
|---|---|---|---|
| EP | 0 624 848 A | | 11/1994 |
| EP | 1 146 481 A | | 10/2001 |
| EP | 289 309 A | | 3/2003 |
| JP | 11-98370 | | 4/1999 |
| JP | 2001-78038 | | 3/2001 |

* cited by examiner

*Primary Examiner*—Yon Couso
(74) *Attorney, Agent, or Firm*—Fulbright & Jaworski LLP (57) ABSTRACT

Luminance of defective pixels is adjusted. A target pixel is selected from the plurality of defective pixels. A normal pixel is searched and detected on each of opposed sides across the target pixel along each of a plurality of search lines extending through the target pixel. There are calculated a first pixel value ratio which is a ratio between a pixel value of one normal pixel located on one side across the target pixel and a pixel value of a further normal pixel located on the other side across the target pixel, a second pixel value ratio which is a ratio between the pixel value of said one normal pixel and a pixel value of the target pixel after the luminance adjustment thereof, and a third pixel value ratio which is a ratio between the pixel value of the further normal pixel and the pixel value of said target pixel after the luminance adjustment thereof. A weight coefficient for each search line is calculated, based on the first, second and third pixel value ratios. An interpolation value for the target pixel is calculated for each search line. Then, a correction value for the target pixel is calculated, based on the weight coefficient for each search line and the interpolation value for the target pixel, and the target pixel is corrected based on the correction value.

7 Claims, 5 Drawing Sheets

IMAGE PROCESSING APPARATUS AND IMAGE PROCESSING METHOD FOR CORRECTING IMAGE DATA

BACKGROUND OF THE INVENTION

This application claims priority from JP2004-58964 filed Mar. 3, 2004 herein incorporated by reference in its entirety.

1. Field of the Invention

The present invention relates to an image processing apparatus, method, and program for correcting image data. In particular, the invention relates to an image processing technique which allows appropriate correction or "retouching" of the image data even when a boundary (edge) or pattern portion of a recorded image is present within its defective portion, by appropriately reflecting such boundary, pattern or the like in the correction.

2. Description of the Related Art

A photographic film may include a defective portion on its surface, such as a scar, dust, dirt, etc. Then, when a photographically recorded image is read from such "defective" film to be printed on a print sheet or outputted on a display, there is known a technique available for correcting such defect by means of an image processing operation relying on e.g. a luminance adjustment technique and an interpolating technique.

An exemplary technique is known from Japanese Patent Application "Kokai" No.: 11-98370 (at pages 15-16, FIG. 4 thereof in particular). This technique effects correction by way of luminance adjustment, based on the unique property of infrared beam. Namely, unlike the visible beam, the infrared beam, when irradiated on an exposed photographic film, is hardly affected by a photographic image recorded thereon, but affected only by such physical defect as a scar, dust or the like. Referring more particularly to this technique, both infrared beam and visible beam are irradiated on an exposed photographic film. Then, a portion of the film where a pixel value of infrared image data is below a predetermined threshold is determined as a defective portion. Then, to a pixel value of each color component (red (R), green (G), blue (B)) of this defective portion, a correction value is added as a "gain" which corresponds to an amount of luminance attenuation occurring in the defective portion relative to a normal (non-defective) portion of the film, thereby to positively increase the luminance. In this way, the pixel value of each color component of the defective portion is adjusted or corrected relative to the normal portion by means of luminance enhancement.

However, this luminance adjustment technique is based on an assumption that the pixel values of the respective color components of the defective portion have experienced an equal amount of luminance attenuation. For this reason, if the amounts of attenuation in the pixel values of the respective color components differ from each other as may happen in the case of a scar in an emulsion surface on the film, the above technique cannot correct this defect appropriately.

In such case, an interpolation technique may be employed which corrects the defective portion by utilizing pixel values of non-defective, i.e. normal pixels adjacent thereto as reference values for the defect correction. However, if the defective portion includes a boundary (edge) or a pattern of the photographic image recorded on the film, such defective portion cannot be properly corrected by the above technique if it simply applies pixel values of adjacent non-defective pixels to the defective portion for its correction. In an attempt to cope with this problem, there has been proposed a further technique known from e.g. Japanese Patent Application "Kokai" No. 2001-78038 (in particular, at pages 7-8, FIGS. 4-5 and FIG. 8), which detects a direction along which the image boundary is present and then effects the interpolation along that detected direction. More particularly, along a plurality of differing directions from the defective portion, the technique calculates image "attribute" values such as a density gradient of the normal pixels, a distance between the normal pixels, etc. Then, for each of the plural directions, based on the data of normal pixels present along a predetermined direction relative to the defective portion on the image, a correction value for correcting the defective portion is obtained by interpolation. Thereafter, based on the calculated image attribute values and the correction values calculated for the respective directions, a final correction value is obtained and used for correcting the defective portion.

Yet, this conventional interpolation correction technique exemplified by the Japanese Patent Application "Kokai" No. 2001-78038 discussed above still suffers a problem as follows. Namely, as this correction technique corrects defect based on normal pixels present around a defective portion, in case the image has a complicated boundary due to presence of a complicated pattern or image edge or the like therein, it is difficult to judge the presence of such image boundary, based solely on the normal pixels present about the defective portion. As a result, accurate correction of defective portion is difficult. Especially, when the defective portion has a large area, the possibility of presence of such complicated boundary or pattern is high. So, accurate correction is difficult.

SUMMARY OF THE INVENTION

In view of the above-described state of the art, a primary object of the present invention is to provide an image processing technique, realized as e.g. an image processing apparatus, an image processing method, and an image processing program, capable of effecting accurate correction even when a complicated image boundary or the like is included in the defective portion, by appropriately reflecting such boundary, pattern or the like in the correction.

For accomplishing the above-noted object, according to one aspect of the present invention, there is proposed an image processing apparatus for correcting a defective portion in image data having a plurality of pixels, the apparatus comprising:

a luminance adjusting section for adjusting luminance of deflective pixels included in the image data;

a target pixel selecting section for selecting one target pixel from the plurality of defective pixels included in the image data;

a normal pixel searching/detecting section for searching/detecting a normal pixel on each of opposed sides across the target pixel along each of a plurality of search lines extending through the target pixel;

a pixel value ratio calculating section for calculating, for each said search line, a first pixel value ratio which is a ratio between a pixel value of the one normal pixel located on one side across the target pixel and a pixel value of the further normal pixel located on the other side across the target pixel, a second pixel value ratio which is a ratio between the pixel value of said one normal pixel and a pixel value of said target pixel after the luminance adjustment thereof, and a third pixel value ratio which is a ratio between the pixel value of said further normal pixel and the pixel value of said target pixel after the luminance adjustment thereof;

a weight coefficient calculating section for calculating a weight coefficient for each said search line, based on said first, second and third pixel value ratios;

an interpolation value calculating section for calculating an interpolation value for said target pixel for each said search line, based on the pixel values of the normal pixels detected by the normal pixel searching/detecting section along that search line;

a correction value calculating section for calculating a correction value for said target pixel, based on said weight coefficient for each said search line and said interpolation value for said target pixel; and a correcting section for correcting said target pixel based on said correction value calculated by said correction value calculating section.

Incidentally, when normal pixels are detected on opposed sides across a target pixel along each search line by the normal pixel searching/detecting section, it is possible to adapt this normal pixel searching/detecting section to detect two or more normal pixels on each of the opposed sides across the target pixel. In that case, the pixel value ratio calculating section and the weight coefficient calculating section may use e.g. an average value of the pixel values of such plural normal pixels located on each side as the pixel values of the normal pixels employed in the respective calculation therein.

With the above construction, for each search line, a weight coefficient is calculated, based not only on the pixel value ratio between the opposed normal pixels (i.e. the first pixel value ratio), but also on the pixel value ratios between the luminance-adjusted target pixel in the defective portion and each normal pixel (i.e. the second and third pixel value ratios), so that the pixel values of normal pixels located on an appropriate direction may be employed for the correction, depending on the pixel value condition in the defective portion. As a result, it has become possible to effect accurate correction even when a complicated image boundary or the like is included in the defective portion, by appropriately reflecting such boundary, pattern or the like in the correction.

According to one preferred embodiment of the image processing apparatus relating to the present invention, said pixel value ratio calculating section calculates the first, second and third pixel value ratios for each of a plurality of color components, and said weight coefficient calculating section obtains a minimum value of each said first, second and third pixel value ratios among the plurality of color components and then calculates said weight coefficient based on these minimum values. With this construction, in the case the subject image data comprise color image data having a plurality of color components, by calculating the weight coefficient using the minimum value among the plurality of color components for each of the first through third pixel value ratios, the weight coefficient is calculated based on the "most defective" color component. Hence, as a matter of course, the other color components will be "less defective". Therefore, the calculation of the weight coefficient can be done in such a manner that a greater weight coefficient may be obtained for a search line where the pixel value of the target pixel and the pixel values of the normal pixels are more approximate to each other in all the color components. As a result, it becomes possible to detect more effectively the direction where the image boundary is present and even more accurate correction of the defective portion appropriately reflecting the image boundary has been made possible.

According to another preferred embodiment of the present invention, said correction value calculating section calculates a weighted average value of the interpolation value for the target pixel, based on the weight coefficient for each search line and the interpolation value for the target pixel and then outputs this weighted average value as said correction value for the target pixel. With this construction, the interpolation value for the target pixel for a search direction having higher possibility of presence of image boundary can exert a greater influence on the final correction value, than the interpolation values for the target pixel for other search directions having lower possibility of presence of image boundary. At the same time, the interpolation values for the target pixel for other search directions having lower possibility of presence of image boundary can also exert some limited influence on the final correction value. Hence, this construction can effectively prevent the final correction value from becoming an excessive value, thus restricting irregularity in the correction.

According to still another preferred embodiment of the present invention, said correction value calculating section effects the calculation of the weighted average value of the interpolation value for the target pixel by using a value obtained by raising the weight coefficient for each search line calculated by said weight coefficient calculating section to the n-th power (n is a desired number not smaller than 10). With this construction, by raising the weight coefficient for each search line to the n-th power for enhancement, an interpolation value for a search line having a greater weight coefficient, that is, a search line suitable for the correction, can be enhanced to provide a greater influence on the correction value (weighted average value). Therefore, an interpolation operation on a defective pixel suitably reflecting the image boundary is made possible. In the above, the appropriate value of "n" will differ, depending on the condition of the image to be corrected. Therefore, preferably, this value should be experimentally obtained based on statistic data of various image data.

According to a still further embodiment of the present invention, said interpolation value calculating section effects the calculation of the interpolation value for the target pixel for each search line by means of a linear interpolation between the pixel value of a normal pixel detected on one side across the target pixel on each search line and the pixel value of a further normal pixel detected on the other side. With this construction, an appropriate interpolation value for the target pixel can be calculated, based on the pixel values of the normal pixels present on the opposed sides across the target pixel on each search line and a distance between these normal pixels present across the target pixel.

For accomplishing the above-noted object, according to a further aspect of the present invention, there is proposed an image processing method for correcting a defective portion in image data having a plurality of pixels, the method comprising the steps of:

adjusting luminance of deflective pixels included in the image data;

selecting one target pixel from the plurality of defective pixels included in the image data;

searching/detecting a normal pixel on each of opposed sides across the target pixel along each of a plurality of search lines extending through the target pixel;

calculating, for each said search line, a first pixel value ratio which is a ratio between a pixel value of one normal pixel located on one side across the target pixel and a pixel value of a further normal pixel located on the other side across the target pixel, a second pixel value ratio which is a ratio between the pixel value of said one normal pixel and a pixel value of said target pixel after the luminance adjustment thereof, and a third pixel value ratio which is a ratio between the pixel value of said further normal pixel and the pixel value of said target pixel after the luminance adjustment thereof;

calculating a weight coefficient for each said search line, based on said first, second and third pixel value ratios;

calculating an interpolation value for the target pixel for each said search line, based on the pixel values of the normal pixels detected by the normal pixel searching/detecting section along that search line;

calculating a correction value for said target pixel, based on said weight coefficient for each said search line and said interpolation value for said target pixel; and correcting said target pixel based on said correction value.

With this method, the same function/effect described hereinbefore in connection with the image processing apparatus can be achieved. Hence, it is possible to effect accurate correction even when a complicated image boundary or the like is included in the defective portion, by appropriately reflecting such boundary, pattern or the like in the correction.

The present invention further includes a program for implementing the image processing method described above and a recording medium storing such program therein.

Further and other features and advantages of the invention will become apparent upon reading following detailed description of preferred embodiments thereof with reference to the accompanying drawings.

DESCRIPTION OF THE PREFERRED EMBODIMENTS

Figure 1:
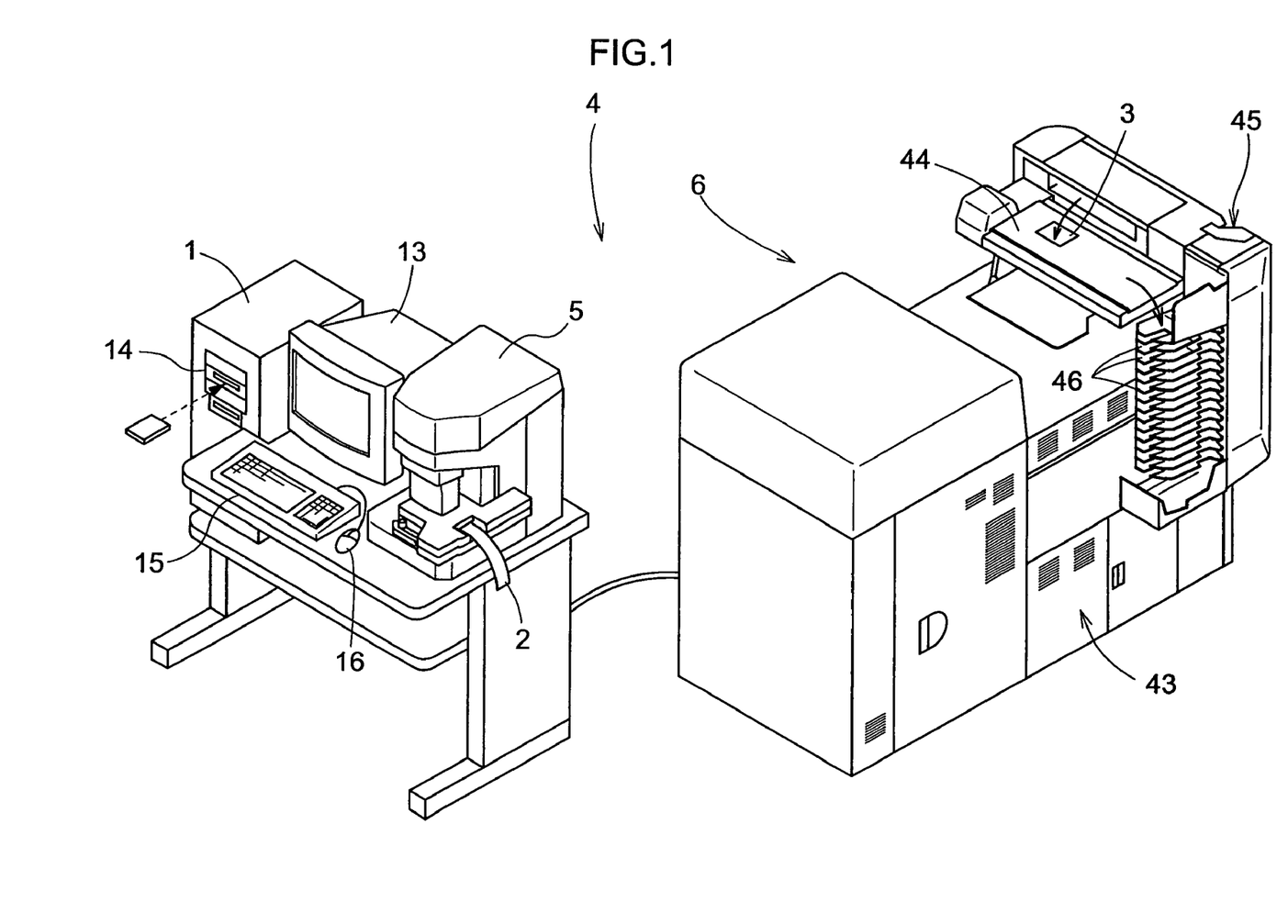
FIG. 1 is a perspective view showing an appearance of an image printing system relating to an embodiment of the invention.
Figure 2:
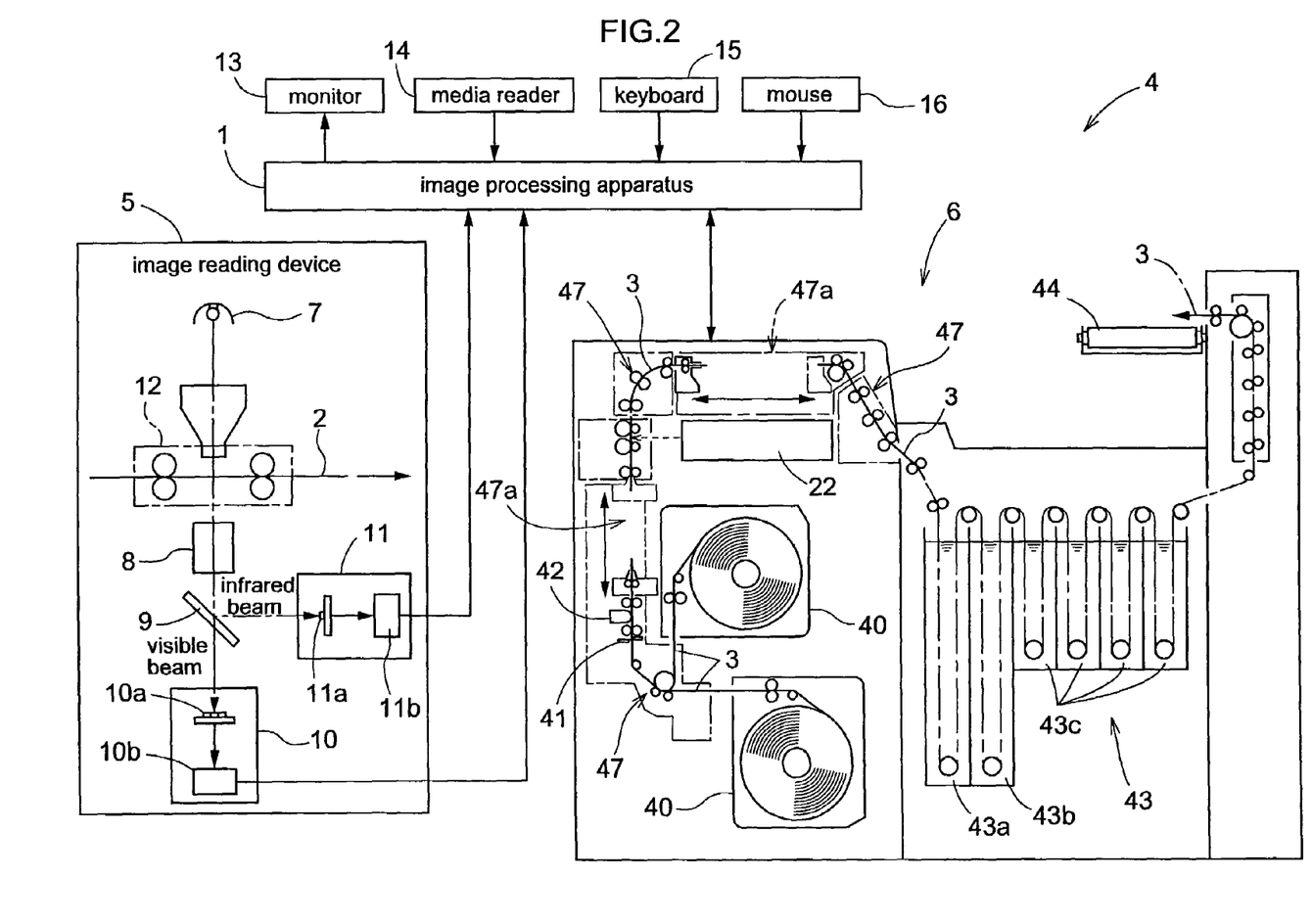
FIG. 2 is a diagram showing a schematic construction of the image printing system relating to the embodiment of the invention.
Figure 3:
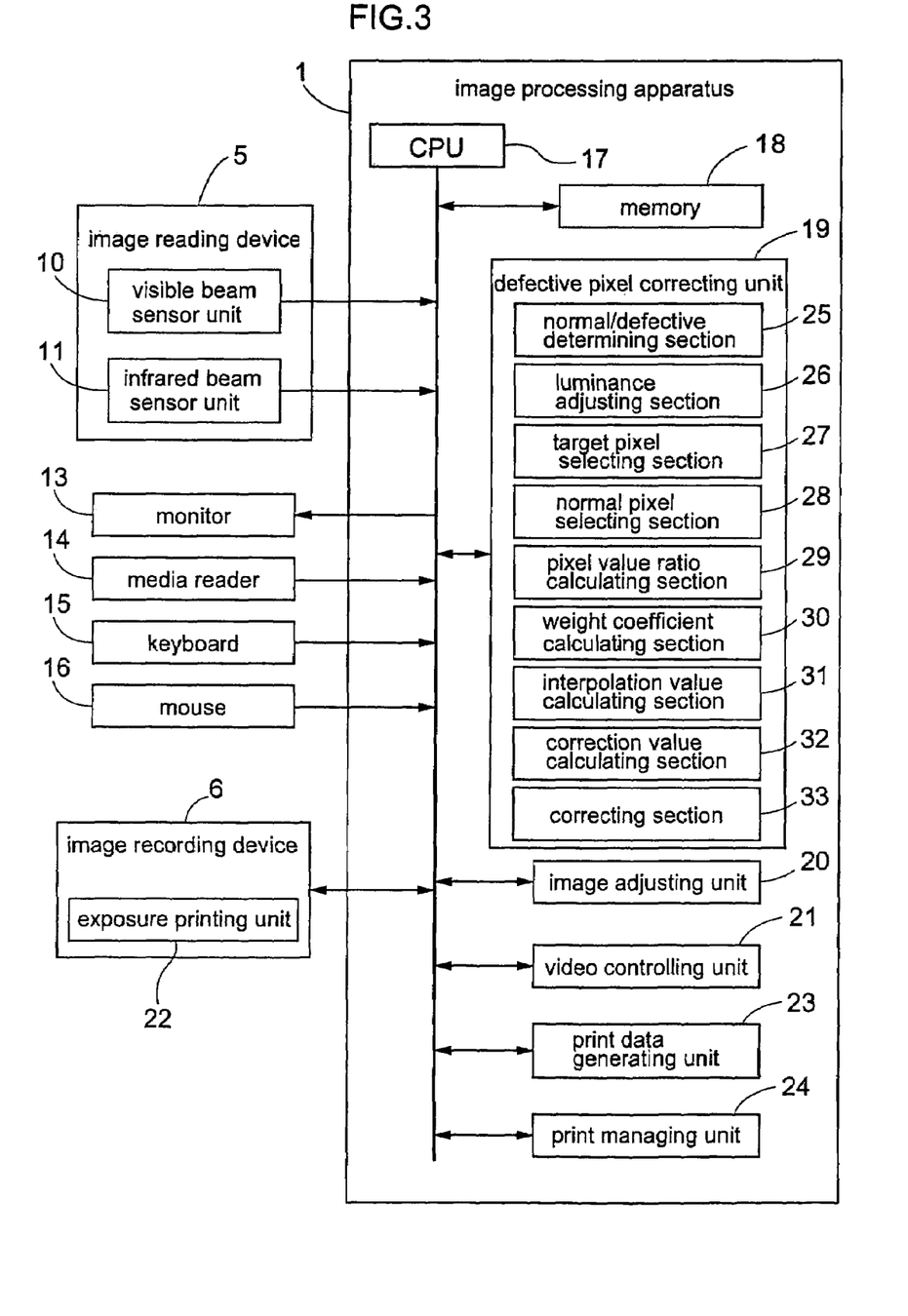
FIG. 3 is a block diagram showing various functional units or sections of an image processing apparatus relating to the embodiment of the invention.

Next, with reference to the accompanying drawings, there will be described an embodiment of the present invention wherein an image processing apparatus 1 relating to the present invention is employed in an image printing system 4 adapted for reading an image from a photographic film 2 and then recording this read film image on a print paper 3. FIG. 1 is a perspective view showing the appearance of the image printing system 4. FIG. 2 is a diagram showing a schematic construction of the image printing system 4. FIG. 3 is a block diagram showing the various functional units of the image processing apparatus 1.

As shown in these figures, this image printing system 4 includes an image reading device 5 for reading a photographically recorded image in each frame of the photographic film 2 developed by an unillustrated film developing device as digital image data, the image processing apparatus 1 configured for generating print data by effecting an image processing operation on the acquired image data, and an image recording device 6 configured for recording an image on the print paper 3 based on the print data from the image processing apparatus 1 by effecting an exposing operation and a developing operation.

The image reading device 5 is a so-called film scanner. As shown in FIG. 2, this device 5 or scanner includes, as principal components thereof, an illuminating optical unit 7, an imaging photographic unit 8 comprising e.g. a zooming lens, a dichroic mirror 9 for separating an incident beam into a visible beam and an infrared beam, a visible beam sensor unit 10, and an infrared beam sensor unit 11. The illuminating optical unit 7 includes a halogen lamp or a light-emitting diode as a light source, a mirror tunnel for modulating the light or beam from the light source, and a diffuser plate, etc. The visible beam sensor unit 10 includes three CCD arrays 10a having color filters adapted for detection of respective color components R (red), G (green) and B (blue) together constituting the visible beam image, and a visible beam signal processing circuit 10b adapted for processing respective visible beam signals acquired by these CCD arrays 10a to produce image data relating respectively to the R beam component, G beam component and B beam component and then sending these data to the image processing apparatus 1. Further, in order to detect a scar or any physical damage which may be present in the photographic film 2 as an infrared image, the infrared beam sensor unit 11 includes a CCD array 11a arranged for receiving only the infrared beam separated by the dichroic mirror 9 and an infrared signal processing circuit 11b for processing infrared signals acquired by the CCD array 11a to produce infrared image data and then sending these data to the image processing apparatus 1.

With the image reading device 5 having the above-described construction, when a photographic image recorded frame of the photographic film 2 is fixed in position at a predetermined reading position, the reading operation of this photographic image is initiated. In this, a projection image of the photographic image of the frame is read in the form of a plurality of discreet slit images by the visible beam sensor unit 10 first and then by the infrared beam sensor unit 11 according to a feeding operation of the photographic film 2 along an auxiliary scanning direction by a film transport mechanism 12, through which the image is subjected to photoelectric conversions into image signals of the respective R, G, B color components and image signals of infrared components, respectively. Then, these signals are all transmitted as the digital image data to the image processing apparatus 1. The control operations by the illuminating optical unit 7, the imaging optical unit 8, the visible beam sensor unit 10 and the infrared beam sensor unit 11 to realize the above-described operations thereof are effected by the image processing apparatus 1. Hence, in the instant embodiment, a functional portion of the image processing unit 1 constitutes a constructional element of the image reading device 5.

In this embodiment, the image processing apparatus 1 comprises basically a general-purpose computer, which includes, as "peripherals" thereof, such components as a monitor 13 for displaying an operation screen of this image printing system 4, a media reader 14 for reading an image from e.g. a memory card of a digital camera, a keyboard 15 and a mouse 16 employed for allowing operator's input operations.

The image processing apparatus 1 has a CPU 17 as a principal component thereof, which includes various functional units or sections for effecting various operations on inputted data, implemented in the form of hardware and/or software. Referring to those functional units particularly pertinent to the present invention, as shown in FIG. 3, a memory 18 is provided for temporarily storing the visible image data and the infrared image data for subsequent various operations thereof. A defective pixel correcting unit 19 is provided for effecting correction of a defective pixel by using the visible image data and the infrared image data stored in the memory 18. An image adjusting unit 20 is provided for effecting various image processing operations, other than the defective pixel correction, on the visible image data mapped in the memory 18, including a color tone correction, a filtering (shading, sharpness adjustment or the like), a trimming, etc. Further, a video controlling unit 21 is provided for inputting the image data and other display items into a video memory and also converting the image mapped in the video memory into video signals by means of a video controller and then sending these video signals to the monitor 13. A print data generating unit 23 is provided for converting the respective final image data processed respectively by the defective pixel correcting unit 19 and the image adjusting unit 20 into the print data and then transmitting these data to an exposure printing unit 22 of the image recording device 6. A print managing unit 24 is provided for controlling the various functional units in accordance with operational instructions inputted by the operator via the keyboard 15 and the mouse 16, etc. under the operation screen created by using a graphical user interface (GUI) or operational instructions programmed in advance.

The defect pixel correcting unit 19 includes the following sections. Namely, a normal/defective determining section 25 is provided for determining whether each pixel included in the visible image data is a normal pixel or a defective pixel, based on the infrared image data stored at the memory 18 and then creating a normal/deflective map (coordinates system) in which normal pixels and defective pixels are stored or registered in association with their coordinates. A luminance adjusting section 26 is provided for adjusting luminance of a pixel which was determined as a defective pixel by the normal/defective determining section 25. A target pixel selecting section 27 is provided for selecting a plurality of target pixels O one after another from those pixels determined as defective pixels by the normal/defective determining section 25. A normal pixel searching/detecting section 28 is provided for searching/detecting one or more normal pixels P on each of opposed sides across the target pixel O selected by the target pixel selecting section 27, along each one of a plurality of search lines L extending through that target pixel O. A pixel value ratio calculating section 29 is provided for calculating a first pixel value ratio F1 which is a ratio between a pixel value of one normal pixel P1 located on one side across the target pixel O and a pixel value of a further normal pixel P2 located on the other side across the target pixel O, a second pixel value ratio F2 which is a ratio between the pixel value of said one normal pixel P1 and a pixel value of said target pixel O after the luminance adjustment thereof, and a third pixel value ratio F3 which is a ratio between the pixel value of said further normal pixel P2 and the pixel value of said target pixel O after the luminance adjustment thereof. A weight coefficient calculating section 30 is provided for calculating a weight coefficient W for each said search line L, based on said first, second and third pixel value ratios F1, F2, F3. An interpolation value calculating section 31 is provided for calculating an interpolation value H for the target pixel O for each said search line L, based on the pixel values of the normal pixels P detected by the normal pixel searching/detecting section 28 along that search line L. A correction value calculating section 32 is provided for calculating a correction value A for said target pixel O, based on said weight coefficient W for each said search line L and said interpolation value H for said target pixel O. A correcting section 33 is provided for correcting said target pixel O based on said correction value A calculated by said correction value calculating section 32. These function units can be realized advantageously in the form of a storage device such as a hard disc drive, a ROM (Read Only Memory) or a program stored in a storage medium such as a CD (Compact Disc), a DVD, etc. Incidentally, the marks "O", "P", "L", "F", "H", "W" and "A" generically represent the target pixel, the normal pixels, the search line, the pixel value ratios, the interpolation value, the weight coefficient, and the correction value, which may be present in plurality. In the following discussion, marks with numerical or alphabetical subscripts, such as "P0", "L0" will be used to represent a particular one of a plurality of them.

In the image recording device 6, as shown in FIG. 2, a print paper 3 in the form of roll stored in each of two print paper magazines 40 is drawn out and then cut by a sheet cutter 41 into a print size. On a back face of this cut print paper 3, a back printing unit 42 prints various print processing information including color correction information, a serial frame number, etc. Further, an exposure printing unit 22 effects an exposure of the front face of the print paper 3 with a photographic image. Then, this exposed print paper 3 is introduced for its development to a developing tank unit 43 having a plurality of developing liquid tanks. After being dried, the print paper 3 is sent from a transverse conveyer 44 disposed at an upper portion of the recording device to a sorter 45, in which a plurality of print papers 3 are stacked on a plurality of trays 46 of this sorter 45 as being sorted out in the storage unit of customer's order (see FIG. 1).

Further, for use with this image recording device 6, there is provided a print paper transporting mechanism 47 for transporting the print paper 3 at a transporting speed suitable for each processing. The print paper transporting mechanism 47 consists essentially of a plurality of pairs of pinched-transport rollers including chucker type print paper transport units 47a disposed forwardly and rearwardly of the exposure printing unit 22 relative to the transporting direction of the print paper. The exposure printing unit 22 includes line exposure heads for effecting irradiation of laser beams of three R, G, B primary colors along a main scanning direction on the print paper 3 being transported in a sub scanning direction, based on the print data transmitted from the image recording device 6. The developing tank unit 43 includes a color development tank 43a reserving therein a color developing liquid, a bleaching-fixing tank 43b reserving therein a bleaching-fixing liquid and a stabilizing tank 43c reserving therein a stabilizing liquid.

Figure 4:
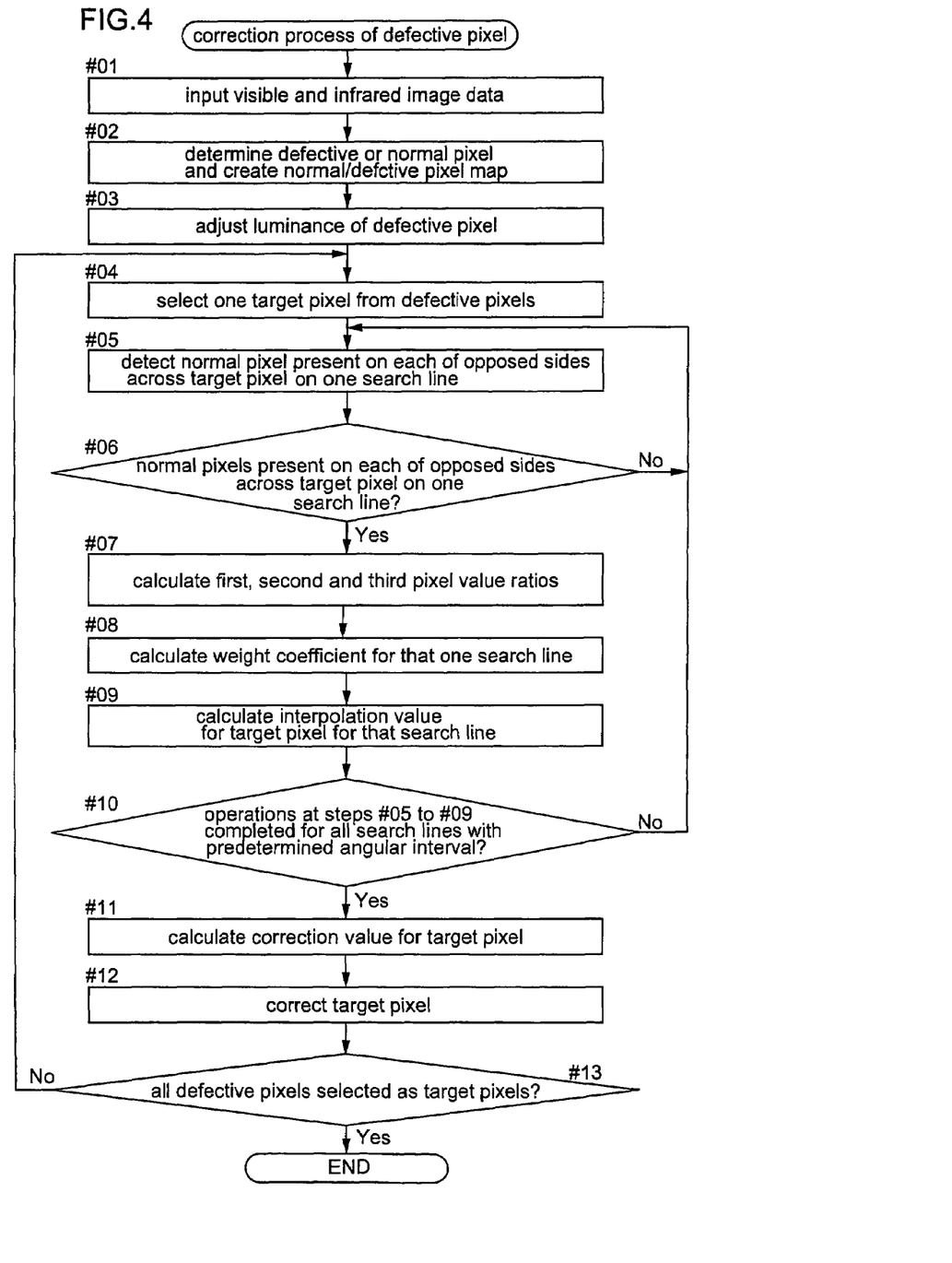
FIG. 4 is a flowchart of a correcting operation for correcting a defective pixel relating to the embodiment of the invention.

Next, the correction operation of a defective pixel relating to this embodiment will be described in details with reference to the flowchart shown in FIG. 4.

First, the visible image data and the infrared image data acquired respectively by the visible sensor unit 10 and the infrared sensor unit 11 of the image reading device 5 are inputted to and stored at the memory 18 (step #01). Then, by using the infrared image data stored at the memory 18 at step #01, the normal/defective determining section 25 determines whether each pixel included in the visible image data is a normal pixel or a defective pixel, thereby to create a normal/defective map recording respective coordinates of the normal pixels and the defective pixels therein (step #02). Specifically, in this process, if a pixel included in the infrared image data has a pixel value greater than a predetermined threshold value, this pixel is determined as a normal pixel. Whereas if the pixel has a pixel value below the threshold value, then, this pixel is determined as a defective pixel. Then, information indicative of being normal/defective is recorded (or registered) in the normal/defective map in correspondence with the coordinates of each pixel. The predetermined threshold value employed in this process can advantageously be a value obtained based on an average value of pixel values of all pixels included in the infrared image data.

Next, the luminance adjusting section 26 effects the luminance adjustment on a pixel determined as a defective pixel at step #02 to adjust the luminance thereof based on its non-defective condition (step #03). According to one example of the method used for the luminance adjustment at this step, an average value of pixel values of all normal pixels included in the infrared image data may be obtained first. Then, a difference between this average value and the pixel value of each defective pixel will be calculated as a luminance attenuation amount suffered by each defective pixel due to the presence of e.g. a scar. Then, this attenuation amount may be added as a "gain" to the pixel value of each defective pixel for each of the R, G, B components. In this way, the luminance of all defective pixels included in the visible image data can be adjusted. The luminance adjustment method for use in this luminance adjustment operation is not limited to the above. Any other luminance adjustment method such as the method described hereinbefore in the background art section herein may be employed also.

Then, the target pixel selecting section 27 selects one target pixel O from those pixels determined as defective pixels by the normal/defective determining section 25 (step #04). This target pixel O is one of the pixels registered as a defective pixel in the normal/defective map and which defective pixel is not yet selected as a target pixel O. In this, from the defective pixels, any single pixel can be selected as the target pixel, as long as it is not yet selected as a target pixel O. However, all of the defective pixels included in the visible image data will be selected eventually as the target pixels O.

Figure 5:
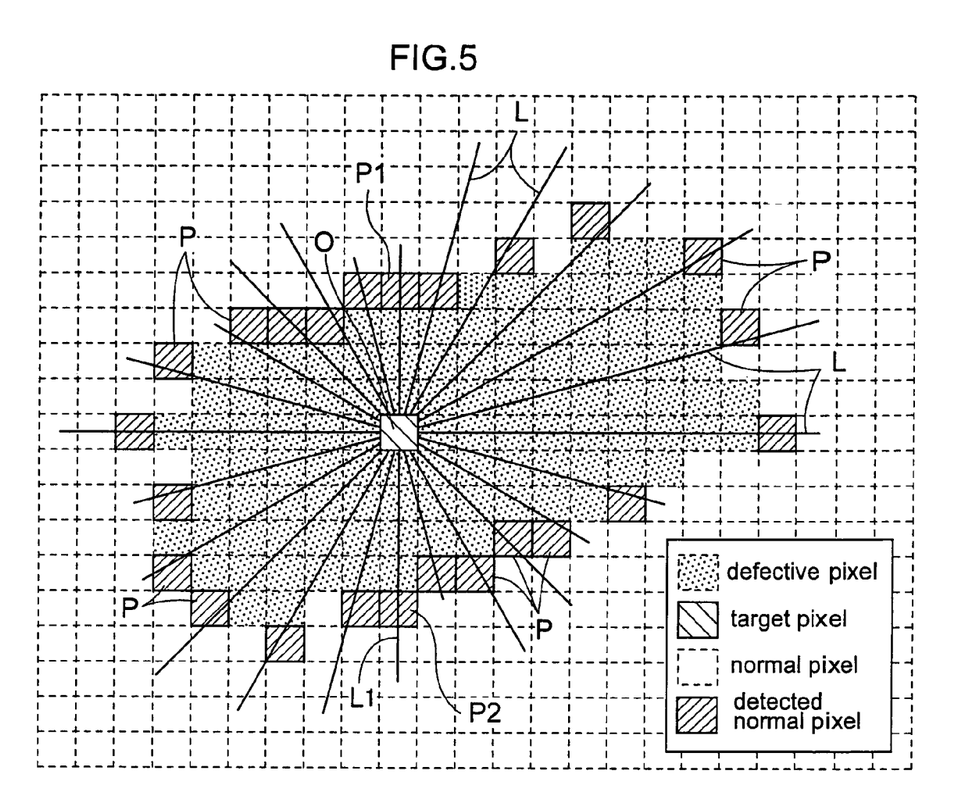
FIG. 5 is an explanatory view illustrating an exemplary operation included in the correcting operation for correcting a defective pixel relating to the embodiment of the invention wherein normal pixels are searched and detected along a plurality of search lines extending across one defective pixel.

Thereafter, the normal pixel searching/detecting section 28 sets a plurality of search lines L extending through the target pixel O in accordance with a predetermined angular interval between the adjacent search lines L, and then searches and detects a normal pixel P1, P2 on each of opposed sides across the target pixel O along each search line L extending in one direction (step #05). FIG. 5 shows an example of the process for detecting the normal pixels P along a plurality of search lines L extending through the target pixel O. In this illustrated example, the angular interval between adjacent search lines L is "15 degrees". In this, one search line L consists of two opposed segments across the target pixel O extending in the opposite directions therefrom and present on one straight line of the plurality of radially extending directions about the target pixel as the center. The angular interval between adjacent search line L may be set appropriately, depending on e.g. the number of pixels included in the image data.

In searching and detecting normal pixels P along the search lines L, except for the cases of the adjacent search lines L having an angular interval of 90 degrees or 45 degrees, the search line L does not necessarily extend through the centers of all the pixels. Then, in such case, each pixel whose center is closest to its corresponding portion on the search line L will be interpreted as a pixel present on that search line L. And, in searching the normal pixels P, determination of each pixel whether it is a defective pixel or a normal pixel is effected in a direction from the target pixel O to the outer side along the search line L. And, among those normal pixels, the one closest to the target pixel O will be detected as the normal pixel P on each side across the target pixel O along that search line L. Incidentally, in this particular embodiment, one such normal pixel P1, P2 is detected on each side across the target pixel O along one search line L1, so that by using pixel values of these normal pixels P1, P2, calculations will be effected later for obtaining the first through third pixel value ratios F1, F2, F3, an interpolation value H and a weight coefficient W for the target pixel O. In this regard, it is also possible to search and detect two or more normal pixels P on each side across the target pixel O, so that the subsequent calculations of the first through third pixel value ratios F1, F2, F3, the interpolation value H and the weight coefficient W for the target pixel O may be effected by using an average value of these two or more normal pixels P. Further, the searching/detecting operation of the normal pixels P need not be effected exactly on/along or substantially on/along the search line L. Instead, this operation may be effected for pixels including those located in the vicinity of the search line L.

Then, after the searching of the normal pixels P1, P2 along the one search line L1 described above, the process determines whether a normal pixel P1, P2 has been detected on each of the opposed sides of the target pixel O within the predetermined distance therefrom (step #06). This is done because a value of a normal pixel P away from the target pixel O is not suitable for use in the correction of the target pixel O. Hence, if no normal pixel P is present within the predetermined distance, values of normal pixels P present along that search line L will not be used for the calculations of the first through third pixel value ratios F1 through F3 or the calculation of the interpolation value H for the target pixel O. Therefore, if no normal pixel is detected within the predetermined distance even on either one side across the target pixel O (NO at step #06), then, the process returns to step #05 to detect normal pixels P along a next one search line L. In this, the predetermined distance may be a desired constant value represented simply by the distance (the number of pixels), such as "25" (twenty five) pixels or may be a value variable according to the number of pixels contained in the image data, by using e.g. a table in which the total number pixels of the subject image data and the predetermined distance are registered.

On the other hand, if a normal pixel P1, P2 was detected on both sides within the predetermined distance across the target pixel O along the one search line L1 (YES at step #06), then, the pixel value ratio calculating section 29 calculates, for this search line L1, the first pixel value ratio F1 which is a ratio between a pixel value of the one normal pixel P1 located on one side across the target pixel O and a pixel value of the further normal pixel P2 located on the other side across the target pixel O, the second pixel value ratio F2 which is a ratio between the pixel value of said one normal pixel P1 and a pixel value of said target pixel O after the luminance adjustment thereof, and the third pixel value ratio F3 which is a ratio between the pixel value of said further normal pixel P2 and the pixel value of said target pixel O after the luminance adjustment thereof. In this embodiment, the invention is applied to color image data having a plurality of color components, as image data to be processed. Therefore, the pixel value ratio calculating section 29 calculates the first pixel value ratio F1, the second pixel value ratio F2 and the third pixel value ratio F3 for each of the plural color components (step #07). In this example, as described hereinbefore, the plurality of color components processed by the image processing apparatus 1 are the three color components of R, G, B. The pixel value can have a value from 0 to 255 in the case of image data of 256 gradations. And, the pixel value ratios are ratios of such pixel values of two subject pixels. Examples of calculation methods for calculating the first pixel value ratio F1, the second pixel value ratio F2 and the third pixel value ratio F3 in this embodiment for the respective R, G, B color components are represented by formulas (1) through (9).

[formula 1]

$$F1R = \frac{\min(R1, R2)}{\max(R1, R2)} \quad (1)$$

$$F1G = \frac{\min(G1, G2)}{\max(G1, G2)} \quad (2)$$

$$F1B = \frac{\min(B1, B2)}{\max(B1, B2)} \quad (3)$$

$$F2R = \frac{\min(R0, R1)}{\max(R0, R1)} \quad (4)$$

$$F2G = \frac{\min(G0, G1)}{\max(G0, G1)} \quad (5)$$

$$F2B = \frac{\min(B0, B1)}{\max(B0, B1)} \quad (6)$$

$$F3R = \frac{\min(R0, R2)}{\max(R0, R2)} \quad (7)$$

$$F3G = \frac{\min(G0, G2)}{\max(G0, G2)} \quad (8)$$

$$F3B = \frac{\min(B0, B2)}{\max(B0, B2)} \quad (9)$$

In the above, F1R, F1G, F1B denote the first pixel value ratios for the respective R, G, B color components, F2R, F2G, F2B denote the second pixel value ratios for the respective R, G, B color components, and F3R, F3G, F3B denote the third pixel value ratios of the same. Further, (R0, G0, B0) denote the pixel values of the target pixel O for the respective R, G, B color components, (R1, G1, B1) denote the pixel values of the normal pixel P1 for the respective R, G, B color components, and (R2, G2, B2) denote the pixel values of the normal pixel P2 for the respective R, G, B color components, respectively. And, in the above formula, one of the two subject pixel values which is the greater (max) is employed as a denominator and the other value which is the smaller (min) is employed as a numerator, so that each pixel value ratio F may have a value closer to "1", as the pixel values of the two pixels are closer to each other whereas the ratio F may have a value closer to "0" as the pixel values of the two pixels are away from each other. With this arrangement, the first pixel ratios F1R, F1G, F1B can indicate the degree of proximity between the pixel values for each of the R, G, B components of the opposed normal pixels P1, P2 across the target pixel O, the second pixel ratios F2R, F2G, F2B can indicate the degree of proximity between the pixel values for each of the R, G, B components of the one normal pixel P1 and the luminance adjusted target pixel O, and the third pixel ratios F3R, F3G, F3B can indicate the degree of proximity between the pixel values for each of the R, G, B components of the other normal pixel P2 and the luminance adjusted target pixel O, respectively.

Next, the weight coefficient calculating section 30 calculates the weight coefficients W for the one search line L1, based on the first pixel ratios F1R, F1G, F1B, the second pixel ratios F2R, F2G, F2B, and the third pixel ratios F3R, F3G, F3B (step #08). As will be detailed later, this weight coefficient W for one search line L1 is a coefficient for determining to what degree the interpolation value H of the target pixel O calculated for the one search line L1 at subsequent step #09 is to be used (or reflected) in a final correction value relative to interpolation values H of this target pixel O calculated for the other search lines L. Namely, this coefficient is used for determining the reliability (degree of appropriateness) of the interpolation value H of the target pixel O for each search line L.

In the instant embodiment, for each of the first pixel ratios F1R, F1G, F1B, the second pixel ratios F2R, F2G, F2B, and the third pixel ratios F3R, F3G, F3B, the minimum value (min) among the respective R, G, B color components is obtained and then the resultant minimum values are multiplied together to obtain the weight coefficient W. This method of calculation can be specifically represented by the following formula (10). Incidentally, in the formula (10), "agl" in "Wag1" denotes the angle of each adjacent pair of search lines L extending through the target pixel O. Specifically, this can have a value of predetermined angular interval (in this case, 15 degrees) in the range from 0 degree to 180 degrees.

[formula 2]

$$W_{agl} = \min(F1R, F1G, F1B) \times \min(F2R, F2G, F2B) \times \min(F3R, F3G, F3B) \quad (10)$$

In general, pixel values of pixels located adjacent along a direction transverse an image border vary sharply at the image boundary area. Whereas, no such sharp change occurs between pixels located adjacent along the image boundary. For this reason, in the interpolation of a target pixel O, if e.g. a linear interpolation is effected along such direction transverse an image boundary, it is difficult to effect the interpolation by appropriately deducing such pixel values having a significant variation in the defective portion. Whereas, if the linear interpolation or the like is effected along the direction aligned with the image boundary, it is possible to obtain a more appropriate interpolation value for the target pixel O. Then, if all of the first pixel value ratios F1R, F1G, F1B indicative of the degree of proximity between the pixel values of the respective color components between the normal pixel P1 and the normal pixel P2 located on the opposed sides across the target pixel O along the one search line L have large values close to "1", this means color similarity between the normal pixel P1 and the normal pixel P2. Hence, there is the high possibility of such search line L1 being aligned with the image boundary.

In the above formula (10), "min (F1R, F1G, F1B)" represents the pixel value ratio for one color component where the pixel values of the normal pixel P1 and the normal pixel P2 are the most distant from each other when the values thereof for the R, G, B color components are compared with each other. Hence, the pixel value ratios for the other two color components both have values larger than the above "min (F1R, F1G, F1B)". Therefore, if this "min (F1R, F1G, F1B)" has a large value near "1", this means that the pixel value ratios for all the color components respectively have a large value near "1". Hence, in this case, the normal pixel P1 and the normal pixel P2 have similar colors to each other, indicating the high possibility of the search line L1 being an appropriate interpolation direction.

Further, since the target pixel O has already been subjected to the luminance adjustment at step #03, even if the defect thereof is such defect as results in imbalance among the respective color components, it may be assumed that this target pixel has been corrected to approximate a normal pixel to a certain degree already. Then, if all of the second pixel value ratios F2R, F2G, F2B indicative of the degree of proximity between the pixel values of the respective color components between the one normal pixel P1 and the luminance adjusted target pixel O present along the search line L1 have large values close to "1", this means color similarity between the normal pixel P1 and the target pixel O. Hence, there is the high possibility of such search line L1 being aligned with the image boundary. The same applies to the third pixel value ratios F3R, F3G, F3B.

In the above formula (10), "min (F2R, F2G, F2B)" represents the pixel value ratio for one color component where the pixel values of the normal pixel P1 and the luminance adjusted target pixel O are the most distant from each other when the values thereof for the R, G, B color components are compared with each other. Hence, the pixel value ratios for the other two color components both have values larger than the above "min (F2R, F2G, F2B)". Therefore, if this "min (F2R, F2G, F2B)" has a large value near "1", this means that the pixel value ratios for all the color components respectively have a large value near "1". Hence, in this case, the normal pixel P1 and the luminance adjusted target pixel O have similar colors to each other, indicating the high possibility of the search line L1 being an appropriate interpolation direction. The same as above applies to "min (F3R, F3G, F3B)" in the above formula (10).

Then, in the above formula (10), these "min (F1R, F1G, F1B)", "min (F2R, F2G, F2B)" and "min (F3R, F3G, F3B)" are multiplied together and the resultant product value is used as the weight coefficient W. Therefore, this weight coefficient W can be a more appropriate coefficient which reflects not only the pixel value ratio between the normal pixel P1 and the normal pixel P2 located on the opposed sides across the target pixel O along the one search line L, but also the pixel value ratios between the luminance adjusted target pixel O included in the defective portion and the normal pixel P1 or the normal pixel P2, respectively. Incidentally, this weight coefficient W will be used commonly for the calculations of the correction values A for the respective R, G, B color components, as will be detailed later.

Figure 6:
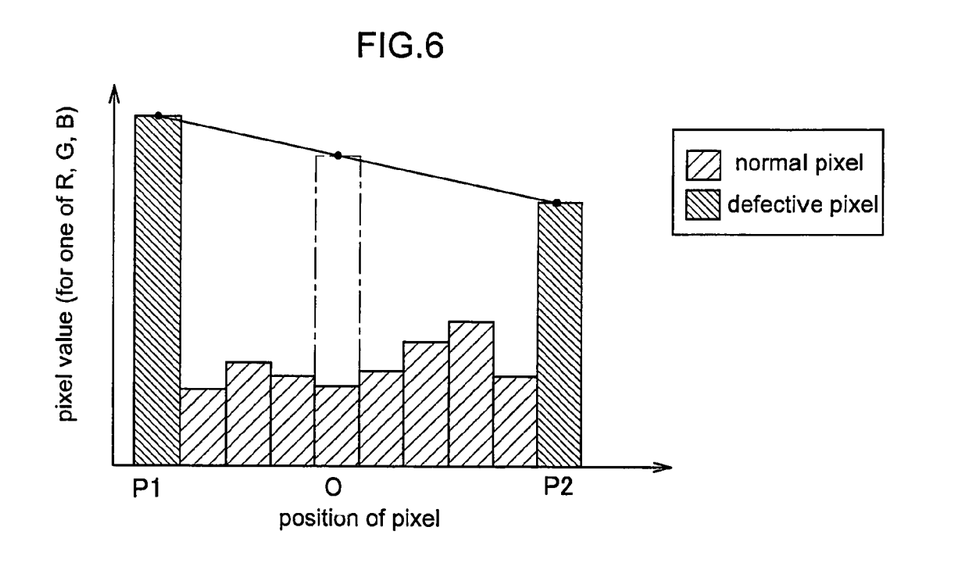
FIG. 6 is a graph illustrating an example of a method for calculating an interpolation value for a target pixel in the correcting operation for correcting a defective pixel relating to the embodiment of the invention.

Thereafter, the interpolation value calculating section 31 calculates an interpolation value H for the target pixel O for that search line L1 along which the normal pixels P1, P2 were detected (step #09). The method of this calculation of the interpolation value H for the target pixel O can be a method for deductively obtaining a pixel value which would be expected to be obtained if the target pixel O were not defective. One specific example of such method is the linear interpolation method. Specifically, for calculating the interpolation value H for the target pixel O by using the pixel values of the normal pixels P1, P2 located on the opposed sides across the target pixel O along the one search line L1 shown in FIG. 5, for each of the R, G, B color components, the pixel values of the normal pixels P1, P2 located on the opposed sides across the target pixel O along the one search line L1 are connected to each other via a straight line. Then, a value on this straight line corresponding to a ratio of distance from the target pixel O to the normal pixel P1 or P2 will be calculated by the linear interpolation technique, whereby for the target pixel O, interpolation values HR, HG, HB will be obtained for the respective color components of R, G, B. In the graph of FIG. 6, the vertical axis represents a pixel value of each pixel (for one of the R, G, B components) and the horizontal axis represents a positional relationship of each pixel located on the search line L. An example of the mathematical formula for obtaining the interpolation value H for the target pixel O relating to this embodiment is indicated as Formula (11) below, taking the R component for example from the R, G, B components.

[Formula 3] (11)

$$HR_{agl} = \frac{D1}{D1 + D2} \times (R2 - R1) + R2$$

In the above, as described hereinbefore, R1 is the pixel value of the one normal pixel P1 located across the target pixel O, R2 is the pixel value of the other normal pixel P2, D1 is the absolute value of the distance from the target pixel O to the normal pixel P1, D2 is the absolute value of the distance from the target pixel O to the normal pixel P2, "agl" in "HRagl" denotes the angle of each of the plurality of search lines L extending through the target pixel O. Specifically, this can have a value of predetermined angular interval (in this case, 15 degrees) in the range from 0 degree to 180 degrees. For the G and B components too, the interpolation values HGagl and HBagl can be calculated, respectively, by the same method as above. Incidentally, the calculation method of the interpolation value H for the target pixel O is not limited to the linear interpolation technique described above. Instead, any other type of interpolation technique can be employed as long as such other method can also deductively obtain a pixel value which would be expected to be obtained if the target pixel O were not defective.

Next, the process determines whether the operations from step #05 to step #09 have been completed for all of the plurality of search lines L extending through the target pixel O and according to the predetermined angular interval (in this case, 15 degrees) (step 10). Then, if it is determined that the operations at steps #05 through #09 have not yet been completed for all of the plurality of search lines L (NO at step #10), the process returns to step #05, so as to select a further search line L than those lines L for which the operations have been completed and to effect the operations from step #05 to step #09 again for that further line.

On the other hand, if it is determined that the operations at steps #05 though #09 have been completed for all the plural search lines L (YES at step #10), the correction value calculating section 32 calculates a correction value A for the one target pixel O selected at step #04 That is, by using the weight coefficient for each search line L and the interpolation value H for the target pixel O calculated at steps #04 through #08, a correction value A for the selected one target pixel O will be calculated. In this case, the above-described weight coefficient Wagl for each search line L and the interpolation values HRagl, HGagl and HBagl of the respective color components of the target pixel O are used for obtaining a weighted average value of the interpolation value H for the target pixel O and this weighted average value is used as the correction value A for the target pixel O. Further, in this calculation of the weighted average value, a value obtained by raising the weight coefficient Wagl for each search line L to the n-th power can be employed advantageously. Specifically, for each of the R, G, B components, first, the interpolation value HRagl, HGagl or HBagl for each search line L is multiplied by the weight coefficient Wagl for that search line L raised to the n-th power. Such product value as above will be obtained for all of the plurality of search lines L extending through the target pixel O. These product values will then be added up to obtain a sum value. Then, this sum value will be divided by a sum of the weight coefficients Wagl raised to the n-th power employed in the calculation of the multiplication operations. An example of this calculation method of the weighted average value AR may be represented by the following formula (12), by taking the R component of the components R, G, B for example. Incidentally, a correction value AG for the G component and a correction value AB for the B component too can be calculated by the same method.

[Formula 4]

$$AR = \frac{\sum_{agl=0}^{180}(HR_{agl} \times W_{agl}^n)}{\sum_{agl=0}^{180} W_{agl}^n} \quad (12)$$

As described above, since the weight coefficient W has a value greater than "0" and smaller than "1", by raising the coefficient W to the n-th power, it is possible to increase the influence of the weight coefficient W to be exerted on the calculation result of the above formula (12), so that the interpolation value H for the target pixel O calculated along the direction along which the image boundary around the target pixel O is present can exert a greater influence on the above correction value A. As a result, this allows more appropriate correction of the defective pixel by reflecting the direction of the image boundary. In this respect, the appropriate value of "n" will differ, depending on the condition of the image to be corrected. Therefore, ideally, this value should be experimentally obtained based on statistic data of various image data. In general, however, if this value of "n" is too small, this will result in blurring of the boundary, edge of the like in the final corrected image. Conversely, if this value of "n" is too large, this will result in excessive sharpness of the boundary, edge or the like. Therefore, in practice, in the case of a standard photography, the appropriate value of "n" ranges from 10 to 30 approximately. Further, for appropriate correction of a boundary between a flesh color and black, the appropriate value of "n" will often be about 20.

Next, the correcting section 33 effects correction of the target pixel O by using the correction values A for the target pixel O calculated at step #11 (step #12). Specifically, the pixel values of the target pixel O for the respective R, G, B components will be replaced by the respective correction values AR, AG, AB.

Next, the process determines whether the operations from step #04 through step #12 have been completed by selecting as the target pixels O all of the defective pixels registered in the normal/defective map at step #02 or not (step #13). If it is determined that the operations have not yet been completed with selection of all the defective pixels as the target pixels O (NO at step #13), the process returns to step #04 to select another target pixel O than those target pixels O whose operations have been completed and then to effect the operations from step #04 to step #12 again. Whereas, if it is determined that the operations have been completed with selection of all the defective pixels as the target pixels O (YES at step #13), the correction operation of the defective pixels by the image processing apparatus 1 is terminated.

In the foregoing embodiment, the image processing apparatus 1 processes the three color components of R, G, B. However, the plurality of color components which can be processed by the present invention are not limited thereto. Instead, depending on the construction of the image reading device 5 for example, such color components as cyan (C), magenta (M), yellow (Y), black (K) can be processed. Further, a single color component alone can be processed also in case the image processing apparatus 1 is configured for processing monochrome image data.

Further, in the foregoing embodiment in the calculation of the correction values A for the target pixel O at step #11, the weight coefficient Wagl for each search line L and the interpolation values HRagl, HGagl and HBagl for the respective color components of the target pixel O are obtained to calculate the weighted average values H for the target pixel O, so that these weighted average values may be used as the correction values A for the target pixel O. However, the calculation method of calculating the correction value A for the target pixel O is not limited thereto. Instead, for example, one search line L along a direction having the greatest weight coefficient Wagl may be selected, then, the interpolation values HRagl, HGagl, HBagl for the respective color components for that selected search line L may be used directly as the final correction values AR, AG, AB without the weighted averaging operation.

In the foregoing embodiment, the present invention is applied to the image printing system 4 configured for reading an image from a photographic film 2 and then recording this on a print paper 3. The application of the present invention is not limited thereto. Rather, this invention can be applied to any other type of image processing apparatus configured for correcting a defective portion in image data and then outputting the corrected data.

The present invention may be embodied in any other manner than described above. Various modifications thereof will be apparent for those skilled in the art without departing from the essential concept thereof defined in the appended claims.

The invention claimed is:

1. An image processing apparatus for correcting a defective portion in image data having a plurality of pixels, the apparatus comprising:
    a luminance adjusting section for adjusting luminance of defective pixels included in the image data;
    a target pixel selecting section for selecting one target pixel from the plurality of defective pixels included in the image data;
    a normal pixel searching/detecting section for searching/detecting a normal pixel on each of opposed sides across the target pixel along each of a plurality of search lines extending through the target pixel;
    a pixel value ratio calculating section for calculating, for each said search line, a first pixel value ratio which is a ratio between a pixel value of one normal pixel located on one side across the target pixel and a pixel value of a further normal pixel located on the other side across the target pixel, a second pixel value ratio which is a ratio between the pixel value of said one normal pixel and a pixel value of said target pixel after the luminance adjustment thereof, and a third pixel value ratio which is a ratio between the pixel value of said further normal pixel and the pixel value of said target pixel after the luminance adjustment thereof;
    a weight coefficient calculating section for calculating a weight coefficient for each said search line, based on said first, second and third pixel value ratios;
    an interpolation value calculating section for calculating an interpolation value for the target pixel for each said search line, based on the pixel values of the normal pixels detected by the normal pixel searching/detecting section along that search line;
    a correction value calculating section for calculating a correction value for said target pixel, based on said weight coefficient for each said search line and said interpolation value for said target pixel; and a correcting section for correcting said target pixel based on said correction value calculated by said correction value calculating section.

2. The image processing apparatus according to claim 1, wherein said pixel value ratio calculating section calculates the first, second and third pixel value ratios for each of a plurality of color components, and said weight coefficient calculating section obtains a minimum value of each said first, second and third pixel value ratios among the plurality of color components and then calculates said weight coefficient based on these minimum values.

3. The image processing apparatus according to claim 1, wherein said correction value calculating section calculates a weighted average value of the interpolation value for the target pixel, based on the weight coefficient for each search line and the interpolation value for the target pixel and then outputs this weighted average value as said correction value for the target pixel.

4. The image processing apparatus according to claim 3, wherein said correction value calculating section effects the calculation of the weighted average value of the interpolation value for the target pixel by using a value obtained by raising the weight coefficient for each search line calculated by said weight coefficient calculating section to the n-th power, wherein n is a desired number not smaller than 10.

5. The image processing apparatus according to claim 1, wherein said interpolation value calculating section effects the calculation of the interpolation value for the target pixel for each search line by means of a linear interpolation between the pixel value of a normal pixel detected on one side across the target pixel on each search line and the pixel value of a further normal pixel detected on the other side.

6. An image processing method for correcting a defective portion in image data having a plurality of pixels, the method comprising the steps of:

adjusting luminance of deflective pixels included in the image data;

selecting one target pixel from the plurality of defective pixels included in the image data;

searching/detecting a normal pixel on each of opposed sides across the target pixel along each of a plurality of search lines extending through the target pixel;

calculating, for each said search line, a first pixel value ratio which is a ratio between a pixel value of the one normal pixel located on one side across the target pixel and a pixel value of the further normal pixel located on the other side across the target pixel, a second pixel value ratio which is a ratio between the pixel value of said one normal pixel and a pixel value of said target pixel after the luminance adjustment thereof, and a third pixel value ratio which is a ratio between the pixel value of said further normal pixel and the pixel value of said target pixel after the luminance adjustment thereof;

calculating a weight coefficient for each said search line, based on said first, second and third pixel value ratios;

calculating an interpolation value for the target pixel for each said search line, based on the pixel values of the normal pixels detected by the normal pixel searching/detecting section along that search line;

calculating a correction value for said target pixel, based on said weight coefficient for each said search line and said interpolation value for said target pixel; and correcting said target pixel based on said correction value.

7. A computer-readable medium comprising computer-executable instructions for correcting a defective portion in image data having a plurality of pixels, the instructions comprising:

adjusting luminance of deflective pixels included in the image data;

selecting one target pixel from the plurality of defective pixels included in the image data;

searching/detecting a normal pixel on each of opposed sides across the target pixel along each of a plurality of search lines extending through the target pixel;

calculating, for each said search line, a first pixel value ratio which is a ratio between a pixel value of one normal pixel located on one side across the target pixel and a pixel value of a further normal pixel located on the other side across the target pixel, a second pixel value ratio which is a ratio between the pixel value of said one normal pixel and a pixel value of said target pixel after the luminance adjustment thereof, and a third pixel value ratio which is a ratio between the pixel value of said further normal pixel and the pixel value of said target pixel after the luminance adjustment thereof;

calculating a weight coefficient for each said search line, based on said first, second and third pixel value ratios;

calculating an interpolation value for the target pixel for each said search line, based on the pixel values of the normal pixels detected by the normal pixel searching/detecting section along that search line;

calculating a correction value for said target pixel, based on said weight coefficient for each said search line and said interpolation value for said target pixel; and correcting said target pixel based on said correction value.

* * * * *